(12) United States Patent
Peters et al.

(10) Patent No.: US 7,134,453 B2
(45) Date of Patent: Nov. 14, 2006

(54) MICROFLUIDIC SWITCH FOR STOPPING A LIQUID FLOW DURING A TIME INTERVAL

(75) Inventors: Ralf Peters, Bergisch-Gladbach (DE); Gert Blankenstein, Dortmund (DE); Holger Bartos, Dortmund (DE); Claus Marquordt, Dortmund (DE)

(73) Assignee: Boehringer Ingelheim Microparts GmbH, Dortmund (DE)

( * ) Notice: Subject to any disclaimer, the term of this patent is extended or adjusted under 35 U.S.C. 154(b) by 370 days.

(21) Appl. No.: 10/762,564

(22) Filed: Jan. 23, 2004

(65) Prior Publication Data

US 2004/0206408 A1 Oct. 21, 2004

(30) Foreign Application Priority Data

Jan. 23, 2003 (DE) ................... 103 02 720

(51) Int. Cl.
*F15B 21/00* (2006.01)
(52) U.S. Cl. .............. 137/806; 137/825; 137/833; 204/601
(58) Field of Classification Search .............. 137/806, 137/825, 833; 204/601
See application file for complete search history.

(56) References Cited

U.S. PATENT DOCUMENTS

| | | | |
|---|---|---|---|
| 5,660,993 A | 8/1997 | Cathey et al. | |
| 5,800,690 A * | 9/1998 | Chow et al. | 204/451 |
| 6,046,056 A * | 4/2000 | Parce et al. | 204/403.05 |
| 6,090,251 A * | 7/2000 | Sundberg et al. | 204/453 |
| 6,296,020 B1 * | 10/2001 | McNeely et al. | 137/806 |
| 6,296,126 B1 * | 10/2001 | Peters | 210/456 |
| 6,615,856 B1 * | 9/2003 | McNeely et al. | 137/14 |
| 6,725,882 B1 * | 4/2004 | Shia et al. | 137/827 |
| 2002/0036018 A1 | 3/2002 | McNeely et al. | |

FOREIGN PATENT DOCUMENTS

| | | | |
|---|---|---|---|
| WO | WO 99/46045 | * | 9/1999 |
| WO | WO 02/24320 A1 | | 3/2002 |
| WO | WO 02/0866333 A1 | | 10/2002 |

* cited by examiner

*Primary Examiner*—A. Michael Chambers
(74) *Attorney, Agent, or Firm*—Hoffman, Wasson & Gitler, P.C.

(57) ABSTRACT

The invention relates to a microfluidic switch for stopping a liquid flow during a time interval with the following features: the switch has at least one first channel and at least one second channel; the first channel and the second channel have a common end area; the first channel in the end area has a stopping mechanism for stopping of a liquid flow flowing in the first channel; the stopping mechanism can be controlled by means of a liquid flow flowing in the second channel for continuing the liquid flow in the first channel. Transport in the first and the second channel takes place advantageously by the capillarity acting in the channel.

26 Claims, 12 Drawing Sheets

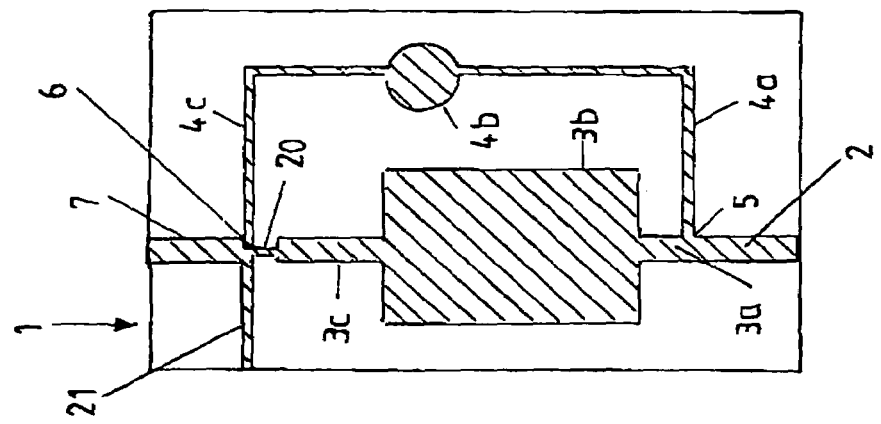
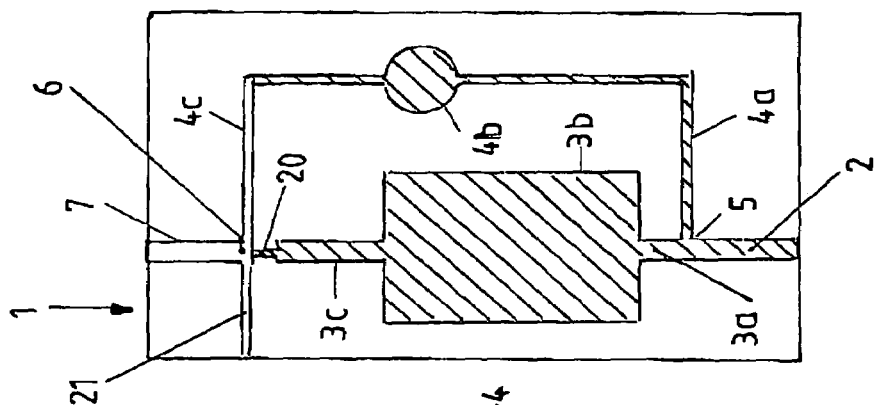
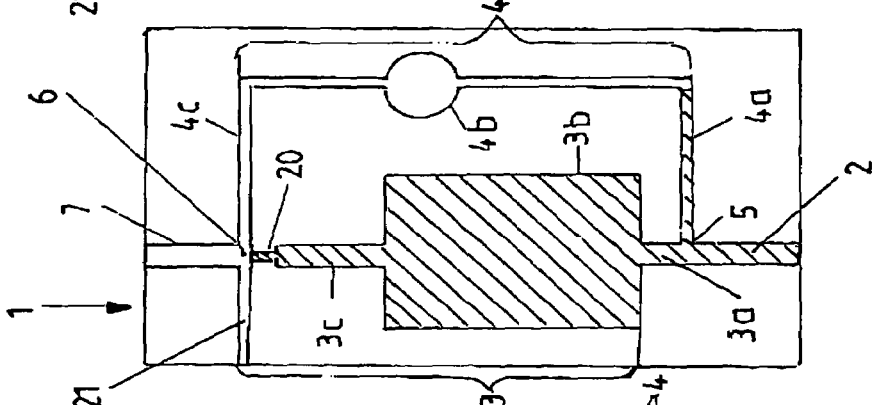
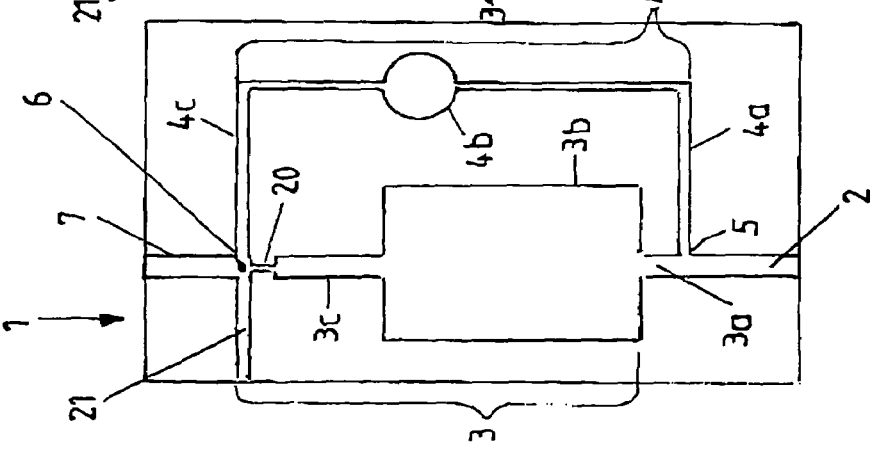

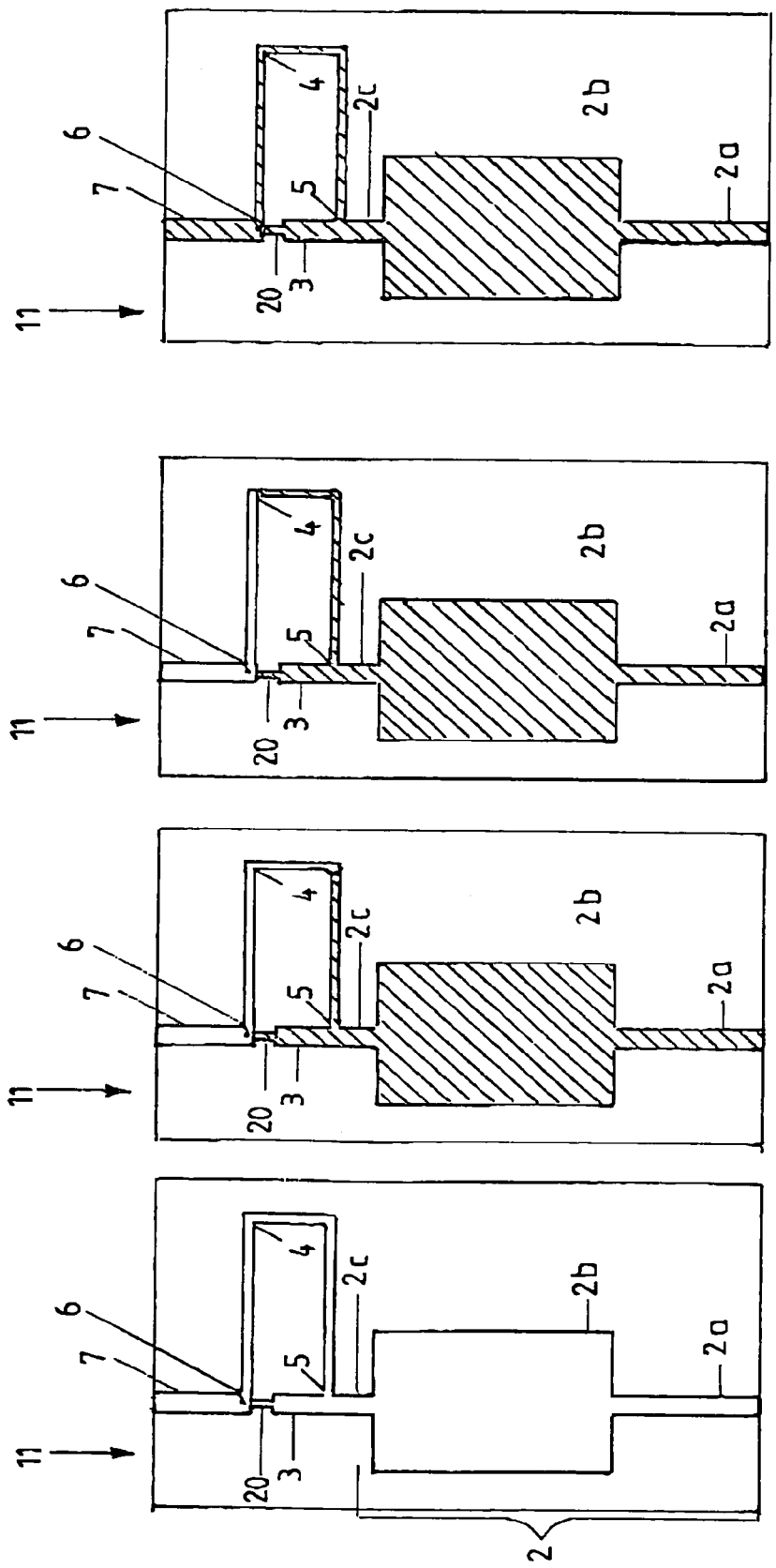

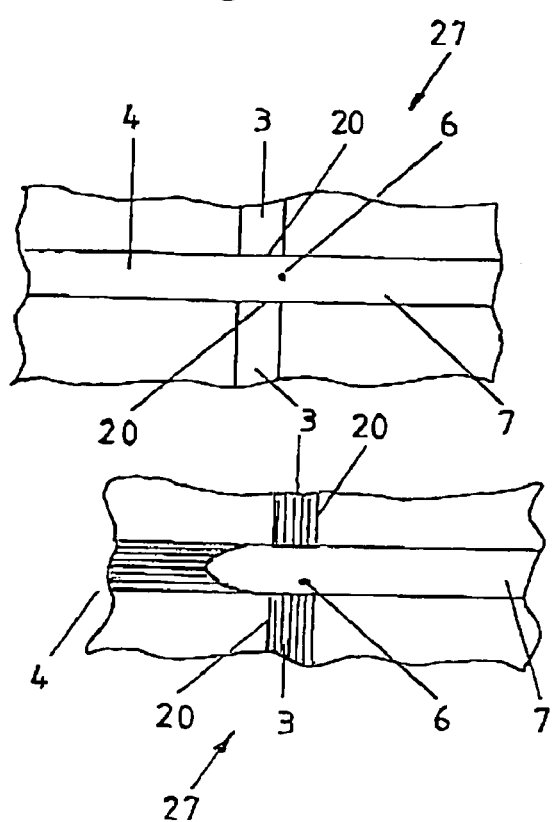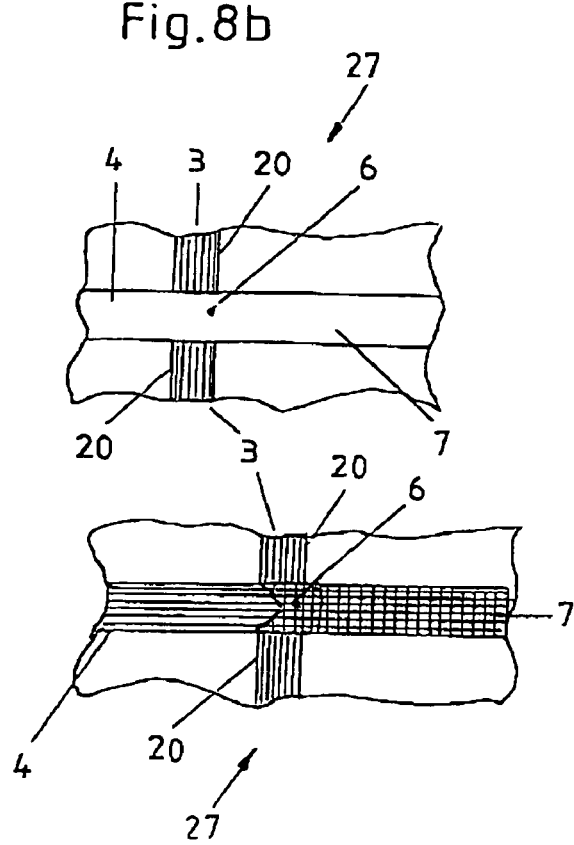

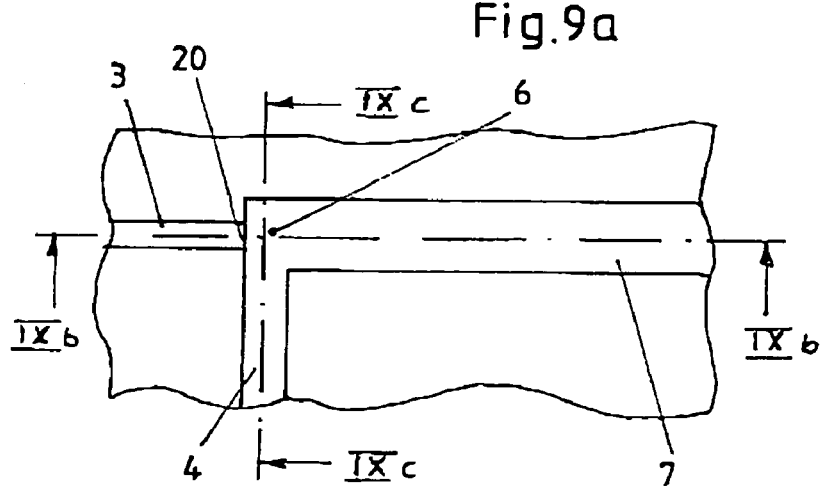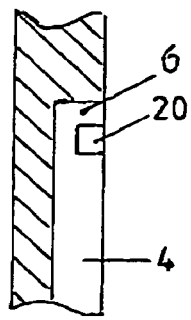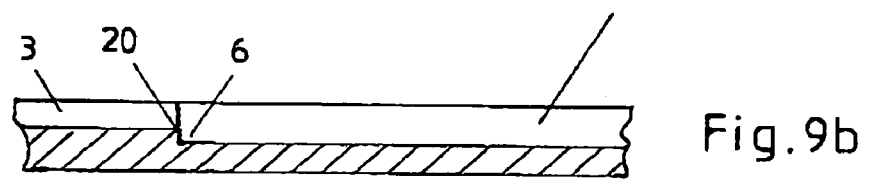
Fig. 9a
Fig. 9c
Fig. 9b
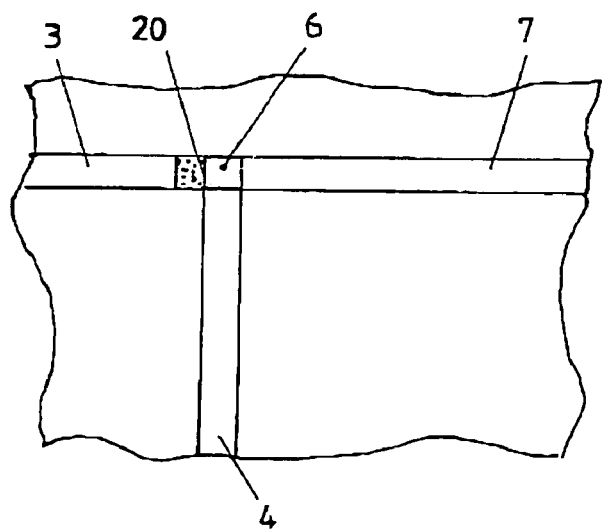
Fig. 11

MICROFLUIDIC SWITCH FOR STOPPING A LIQUID FLOW DURING A TIME INTERVAL

BACKGROUND OF THE INVENTION

This invention relates to a microfluidic switch for stopping a liquid flow during a time interval in a first channel. The liquid flow is to be stopped at the end of the first channel by a stopping means for the defined time interval. After the time interval expires the liquid flow is to be continued. The first channel of the microfluidic switch as well as other channels can be a widening such as for example a cavity and/or a chamber. This channel can be a groove in the surface, which is preferably closed with a cover. Likewise it is possible for the channel to be made as a tube. A channel for the purposes of the invention can fundamentally be any structure, which is suited for routing a liquid or a gas in one certain direction during transport.

A microfluidic switch of the initially mentioned type can be used for example in microfluidic arrangements as known among others from documents WO 99/46045 and U.S. Pat. No. 6,296,126 B1.

For various wet chemical, biochemical and diagnostic analyses it is necessary for the sample liquid to be mixed with reagents for example in a the reaction chamber of a microfluidic arrangement during a defined time interval, during this time interval then the sample liquid being reacted with the reagents into a product. This product is then removed from the reaction chamber in order to be analyzed. The stopping means for known microfluidic arrangements are generally made as mechanical valves, which must be triggered from the outside. These valves are used to fluidically separate individual reaction chambers or also analysis chambers from one another. Via external time control, for example via a computer, the corresponding incubation times, i.e. the time intervals of the residence of the sample or products in the reaction chambers and/or analysis chambers, can be adjusted.

These microfluidic switches with microvalves have the property that they have mechanically moving parts, which for example are accordingly electrically triggered. This leads to high hardware complexity. In addition, integration of these microvalves into the microfluidic switches is complex, especially when the microfluidic switch is made of plastic.

An object of the invention is to propose a microfluidic switch, which makes it possible to stop the liquid flow at the end of the first channel for a predetermined time interval without the need for electrically triggerable microvalves to restart the liquid flow.

SUMMARY OF THE INVENTION

A microfluidic switch as depicted in the invention has in addition to at least one first channel also at least one second channel for stopping the liquid flow during a time interval. The first channel and the second channel have a common end area and the first channel in the end area has a means for stopping (stopping means) of a liquid flow flowing in the first channel. This stopping means can be controlled by means of a liquid flow flowing in the second channel for continuing the liquid flow in the first channel. The liquid flow flowing in the second channel therefore forces the stopping means to overcome the blockage of the liquid flow flowing in the first channel. The microfluidic switch is thus closed and conducting, by analogy to an electric switch.

The stopping means in a microfluidic arrangement of the invention are preferably capillary stops as are known for example from the publication of Hosokawa et al. "Hydrophobic Microcapillary vent for pneumatic manipulation of liquid in μTas", Proc. "Micro Total Analysis Systems '98", pp. 307–310, Banff, Canada. Capillary stops can be produced for example by suddenly changing geometrical properties or properties of the surface of the walls of the first channel to the end area.

A microfluidic switch of the invention can have a common starting area for the first channel and the second channel. The common starting area can be located in the transport direction of the first liquid upstream or downstream of a chamber or a cavity. Then an inlet channel can be connected upstream of the common starting area. It is thus possible to feed the first channel and the second channel with the same liquid, which has been delivered via the inlet channel. But it is likewise possible for the first and the second channel beyond the common end area not to have a connection.

The first channel can be shorter than the second channel. Likewise it is possible for the first channel to have a greater capillarity than the second channel. The pressure difference, which is computed as follows, can be taken as a measure for the capillarity:

$$\Delta P = -2\gamma \cos\theta(1/w + 1/h - 1/W - 1/H),$$

$\gamma$ and $\theta$ denoting the surface tension of the liquid and the edge angle between the liquid and the channel wall and W and H denoting the geometrical quantities of the channel upstream and w and h denoting the geometrical quantities of the channel downstream of the location of the channel.

The first channel can have a smaller volume than the second channel. Moreover the second channel can have means for deceleration (deceleration means) of a liquid flow. The aforementioned measures can be used to decelerate the liquid flow in the second channel such that the liquid flowing in the second channel only reaches the common end area at a later instant than the liquid flowing in the first channel. In this way the time interval can be set for which the liquid flowing in the first channel is stopped by the stopping means.

The deceleration means made in the second channel can be chokes.

An outlet channel can be connected downstream of the common end area of the first and second channel. This outlet channel can be divided into at least two branches. Via these two branches it is then possible to separate the liquid flowing in the second channel downstream of the common end area essentially again from the liquid flowing into the common end area out of the first channel. Preferably then the common end area is made such that the liquids of the first channel and of the second channel lay laminarly on one another when the switch is conducting.

The first channel, the second channel, the inlet channel and/or the outlet channel can have sections with one or more chambers and/or cavities and thus can be made as a channel system. These cavities or chambers can be for example reaction chambers, for which then there are advantageously reagents in the cavities or chambers.

The first and/or the second channel and/or the inlet channel and/or the outlet channel can have meandering sections.

In addition to transport of liquids in the channels by capillarity the liquids can also be transported by pressure differences (overpressure or negative pressure at the respective channel end) at the start and end of a channel, which are caused by pressure generation means. So that the function of the stopping means is preserved, the pressure generation means must be designed or at least adjusted such that the pressure produced by the pressure generation means alone is not enough to transport the liquid out of the first channel via the stopping means. Moreover the forces, which enable transport of the liquids in the channels of the switch, can be electroosmotic, electrophoretic or electrostatic forces.

The switch of the invention can be part of a carrier, especially a sample carrier.

BRIEF DESCRIPTION OF THE DRAWINGS

Microfluidic arrangements of the invention are detailed using the following drawings:

FIGS. 1a to 8d show a first through a seventh embodiment for a microfluidic switch as claimed in the invention;

FIGS. 9a to 9c show a detail of the switch as claimed in the invention;

FIG. 11 shows a detail of another alternative switch as claimed in the invention.

DETAILED DESCRIPTION OF THE INVENTION

Figures 3A, 3B, 3C:
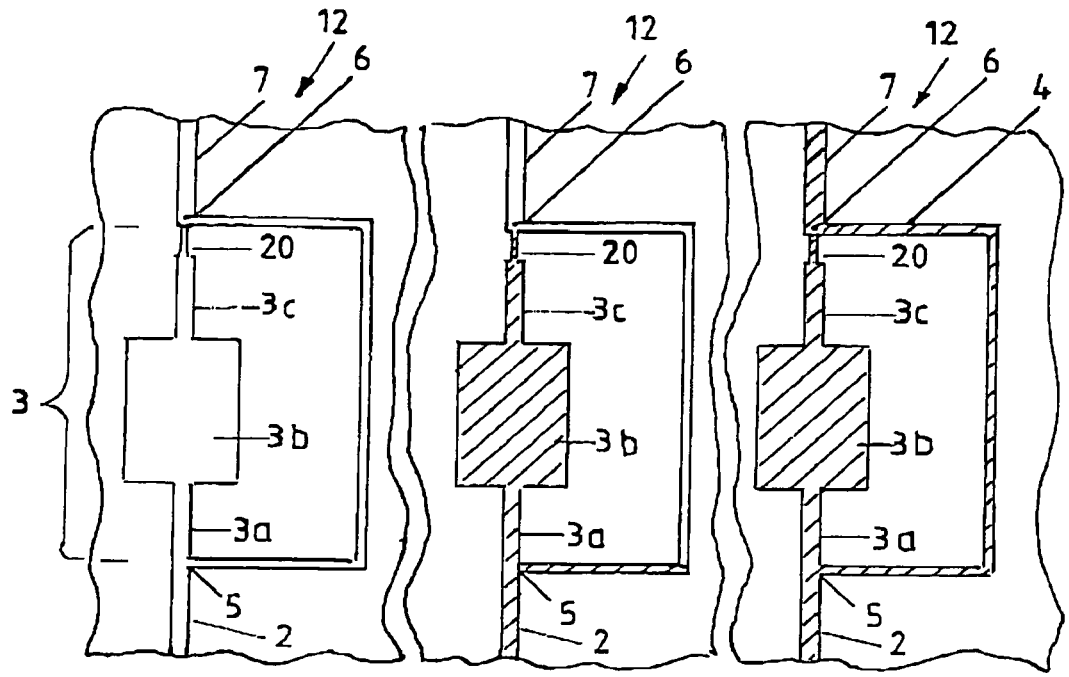

The embodiments of the microfluidic switches of the invention shown in FIGS. 1a to 8d all have at least one first channel 3 and at least one second channel 4 which have a common end area 6. The outlet channel 7 is connected to this common end area 6.

The common end area 6 and the adjoining channels 3, 4, 7 are shown for example enlarged and in extracts in FIGS. 9a to 9c by way of example. First of all, the principle underlying the invention will be explained using these figures.

As already stated, both the first channel 3 and the second channel 4 discharges into the end area 6, while the outlet channel 7 begins in the end area 6. In the end area 6 following the first channel 3 there is a capillary stop 20. The capillary stop 20 is produced by a sudden change of the geometrical properties. This capillary stop 20 forms a barrier to the liquid, which is flowing in out of the first channel system 3. The liquid emerges at the capillary stop 20, but in order to be able to enter the remaining end area 6 via the capillary stop 20 the liquid must overcome a pressure difference $\Delta p$. This pressure difference $\Delta p$ can be described via the following mathematical formula $$\Delta p = -2\gamma \cos \Theta (1/w + 1/h - 1/W - 1/H),$$

Where
w width of the channel, which forms the capillary stop 20,
h height of the channel, which forms the capillary stop 20,
W width of the remaining end area 6 following the capillary stop 20 and
H height of the remaining end area 6 following the capillary stop 20.

Material factors, specifically the edge angle and the surface tension, are incorporated into the computation via $\Theta$ and $\gamma$ (see also Hoskoma et al. loc. cit.). Depending on the wetting behavior of the liquid the suddenly changing geometrical properties can take place by changing from a large to a small cross section or vice versa.

The pressure difference $\Delta p$ which is to be overcome at the capillary stop 20 cannot be made available as a result of the transport forces which cause the flow of the liquid in the first channel 3. The capillary stop 20 therefore constitutes a barrier to the liquid flowing in the first channel 3 as a result of the pressure difference $\Delta p$, which must be overcome. The capillary stop 20 can be overcome by its being wetted with a liquid from the remaining common end area 6. This liquid reduces the surface tension of the liquid at the capillary stop and the liquid, which is dammed up in the capillary stop 20, can escape. In this invention a second liquid is chosen which is led from the outside to the capillary stop 20 into the remaining common end area. This liquid enters into contact with the liquid, which is dammed up in the capillary stop, by which the flow of the first liquid begins again. In the embodiments, which are shown in FIGS. 1a to 8d therefore the action of the capillary stop 20 is neutralized by means of the liquid, fed via the second channel 4.

The second channel 4, as shown in FIG. 9c, has the same depth as the common end area 6 and the adjoining outlet channel 7. In this way interruption of the liquid transport from the second channel 4 into the common end area 6 is prevented. If the second channel 4 prior to its end has a height, which is smaller than the height of the common end area 6, the height of the end area 6 at the end of the second channel 4 can be achieved by construction means. They include for example ramps, steps or notches that bring the bottom of the second channel 4 to the level of the bottom of the end area 6. These notches are described for example in U.S. Pat. No. 6,296,126 B1. In this way the interruption of the flow in the second channel 4 at the transition into the common end area 6 can be prevented.

The common end area 6 conversely has a shoulder towards the first channel (FIGS. 9b, 9c). The common end area thus has a greater depth than the first channel 3. The capillary stop is formed by this sudden change of the geometry.

The detail of one alterative switch as claimed in the invention shown in FIGS. 10a to 10d, in contrast to the switch shown in FIGS. 9a to 9c, has a capillary stop 20, which is connected to the first channel 3 as a channel, which is tapered, compared to the first channel 3. The end of the tapered channel at the transition to the common end area 6 is a capillary stop. Another difference is a pocket-like notch in the transition area between the second channel 4 and the end area 6. Otherwise the switch corresponds to the switch shown in FIGS. 9a to 9c.

Figure 10:
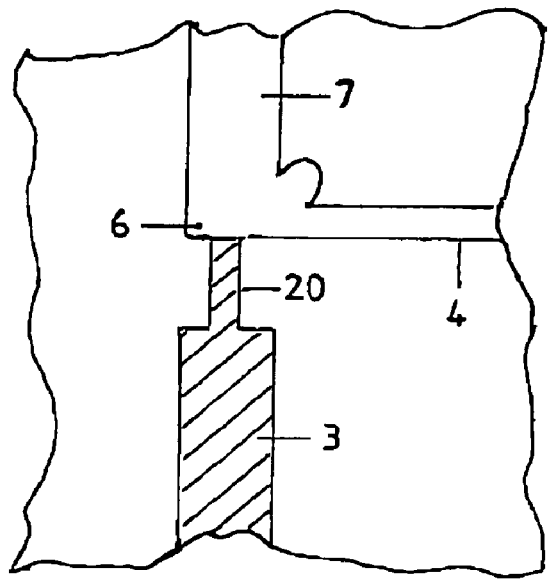
FIGS. 10a to 10d show a detail of an alternative switch as claimed in the invention.
Figure 10:
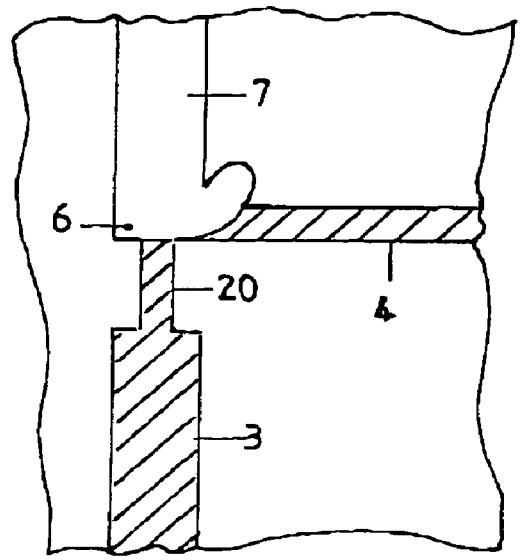
Figure 10:
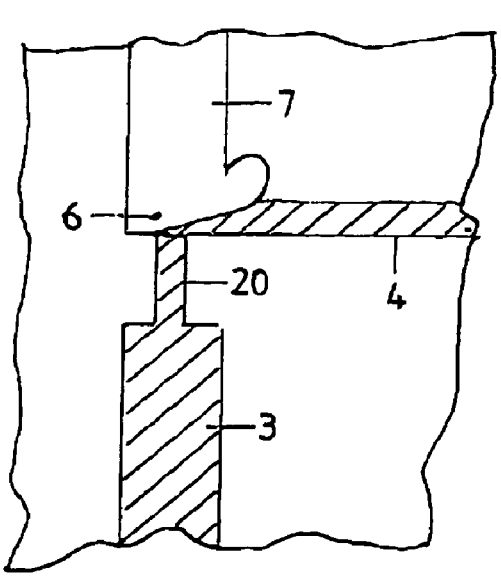
Figure 10:
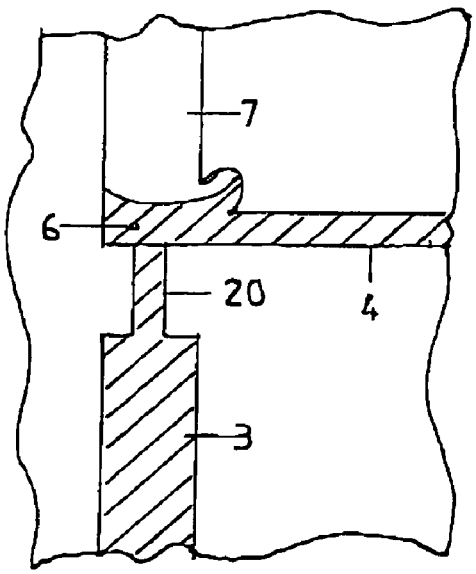

FIG. 10a shows how a liquid flow has penetrated via the first channel 3 into the capillary stop 20 and comes to rest there at the border of the capillary stop 20 to the remaining end area 6 as a result of the surface tension, as already described. As a result of the transport forces, for example, capillarity, the liquid flow is transported to the end area 6 via the second channel 4 which discharges into the end area 6 for example at a right angle or tilted to the first channel 3. As soon as this liquid which has been transported in the second channel 4 has reached the widened region of the end area 6, the liquid flows as a result of the capillarity into the end area 6 into which the capillary stop 20 discharges (FIG. 10b). As soon as the liquid has reached the exit opening of the capillary stop 20 (FIG. 10c), the exit opening is wetted from the outside and the action of the capillary stop 20 is neutralized. The flow of the liquid emerging from the second channel 4 touches the liquid meniscus in the discharge area of the capillary stop 20. The liquid from the second channel 4 and the capillary stop 20 enters into contact and the surface tension, which would have to be overcome at the outlet of the capillary stop 20, is thus reduced. Therefore the liquid, which has been fed via the first channel 3, and also the liquid which has been fed via the second channel 4 completely fill the end area 6 and from there are routed on via the outlet channel 7.

The stopping means which has been formed by the capillary stop 20 can therefore be controlled via the liquid flow which has been fed in the second channel 4 such that the liquid flow which has been interrupted by the stopping means (capillary stop 20) in the first channel 3 can be continued. Construction measures in a microfluidic switch of the invention can result in that first the liquid flow completely fills the first channel 3 before the liquid flow in the second channel 4 neutralizes the interruption of the liquid flow in the first channel 3 on a time-delayed basis.

The detail of another alternative switch as claimed in the invention shown in FIG. 11, in contrast to the switches shown in FIGS. 9a to 9c and in FIGS. 10a to 10d, has a capillary stop 20 which is made by changing the surface properties of the walls in the region of the common end area 6 relative to the bordering first channel 3. While the surface of the wall of the first channel 3 has hydrophilic properties, the surface of the wall in the common end area is provided with hydrophobic properties. By suddenly changing the surface properties in the transition from the first channel 3 to the common end area 6 a capillary stop 20 is formed at which a liquid flow which is fed via the first channel 3 stops, since the transport forces are not enough to overcome the capillary stop 20. The interruption means, which are formed by the capillary stop 20 in this way, can then be triggered in the conventional manner via the liquid, which is fed in the second channel 4 so that transport of the liquid in the first channel 3 is continued.

Using the following representation, different microfluidic switches of the invention are detailed, the differences between the different embodiments being detailed. The individual channels 2, 3, 4, 7 of the switches have mainly cavities and are made in this way as channel systems and hereafter are called as such.

Furthermore, reference is made to FIGS. 1a to 1b. The first embodiment 1 shown in FIGS. 1a to 1b has an inlet channel system 2. This inlet channel system 2 discharges into a starting area 5 in which the first channel system 3 and the second channel system 4 begin. The first channel system 3 following the starting area 5 has a first section 3a in the form of a channel. This first section 3a is connected to a second section 3b. This second section 3b is made as a cavity and chemicals, for example, reagents, can be delivered into this cavity. The second section 3b can thus form a reaction chamber in the microfluidic arrangement according to the first embodiment 1. The second section 3b of the first embodiment 1 is connected via a third section 3c, which likewise is made as a channel like the first section, to the end area 6 and there especially to the capillary stop 20.

Following the starting area 5 the second channel system 4 has a first section 4a, which is made as a channel. This first section is connected to a second section 4b, which is made as a cavity, and which is connected to a third section 4c which discharges into the end area 6.

The operation of the switch of the invention according to the first embodiment 1 is shown using FIGS. 1b to 1d. The microfluidic switch of the invention is filled via the inlet channel system 2. The liquid, which enters the inlet channel system 2, is transported to the starting area 5 as a result of the capillarity in the inlet channel system 2. From there the liquid flow is divided, the channel system 3 being filled more quickly with liquid than the channel system 4. The first section 3a, the second section 3b made as the reaction chamber, and the third section 3c are filled in succession in the first channel system 3 with part of the liquid. From the third section 3c of the first channel system 3 the capillary stop 20 is then filled until the liquid meniscus comes to rest at the end of the capillary stop 20.

The other part of the liquid is transported into the second channel system 4 (FIG. 1b, FIG. 1c). First of all the first section 4a and then the cavity, which forms the second section 4b, are filled. Then the liquid as a result of the acting capillarity enters the third section 4c of the second channel system 4 and travels into the end area 6 delayed in time. In this end area 6 then in the described manner the capillary stop 20 is neutralized. During the time which has passed until the neutralization of the capillary stop 20 by the liquid emerging from the second channel system 4 the reagents placed in the reaction chamber of the second section 3b of the first channel system have reacted with the liquid which has flowed into this second section 3b. By neutralizing the capillary stop 20 the liquid can now be transported out of the reaction chamber due to the acting capillarity and can be removed from the microfluidic arrangement via the outlet channel 7.

Reference is made below to FIGS. 2a to 2d, using which the second embodiment 11 is explained. Like the first embodiment 1 the second embodiment 11 also has an inlet channel system 2. The inlet channel system 2 consists of a first section 2a, which is made as a channel. A second section 2b is connected to this first section 2a. This second section 2b is formed by a cavity. The second section 2b is connected via the third section 2c of the inlet channel system to the starting area 5 in which the first channel system 3 and the second channel system 4 begin. Both the first channel system 3 and also the second channel system 4 are formed by simple channels in the second embodiment 11. The corresponding configuration of the channels of the first channel system 3 and of the second channel system 4 results in that liquid transport in the first channel system 3 takes place much more quickly than in the second channel system 4. The two channel systems 3, 4 discharge in a common end area, and the liquids which are transported in the two channel systems 3, 4 can combine first downstream of the capillary stop 20 located in the end area 6.

The second embodiment 11 of a microfluidic switch is filled via the first section 2a of the inlet channel system. The entering liquid as a result of the acting capillarity is conveyed into the second section 2b of the inlet channel system. The liquid is transported via the third section 2c of the inlet channel system 2 to the common starting point 5 of the first channel system 3 and of the second channel system 4. The first part of the liquid is transported from the starting point 5 into the first channel system 3 and from there penetrates into the capillary stop 20 as a result of the acting capillarity. At the end of the capillary stop 20 toward the other end point 6 the liquid remains at rest. A second part of the liquid of the liquid, which has reached the starting point 5, is transported by the channel of the second channel system 4 to the end area 6 (FIGS. 2b, 2c). As soon as the liquid, which has been transported in the second channel system 4, has reached the end area 6, the capillary stop 20 is neutralized in the described manner. The liquid can then be drawn off via the first channel system 3, the second channel system 4 and the outlet channel system 7. Here transport of the liquid is achieved by means of the acting capillarity.

The third embodiment 12 of a microfluidic switch of the invention is now explained using FIGS. 3a to 3c. The third embodiment 12, which is shown in FIGS. 3a to 3c, differs from the first embodiment, which is shown in FIGS. 1a to 1e essentially in that the second channel system 4 is not divided into different sections. Rather the second, channel system 4 extends as one channel from the starting area 5 to the end area 6. The cross section of this channel is made much smaller than the cross section of the first channel system 3 in the sections 3a and 3c. This has the advantage that the volume of the liquid which has been transported in the second channel system 4 and which is necessary for triggering the interruption means (capillary stop 20) is much smaller. The liquid flowing in via the inlet channel system 2 is therefore almost completely transported into the first channel system 3 and thus also into the reaction chamber which is formed by the second section 3b. This far larger proportion of the liquid amount flowing into the microfluidic arrangement 12, which proportion is transported into the first channel system 3, can thus be reacted into the product without this product then being diluted in the end area 6 by the amount of liquid which is flowing in via the second channel system 4.

Figure 4A:
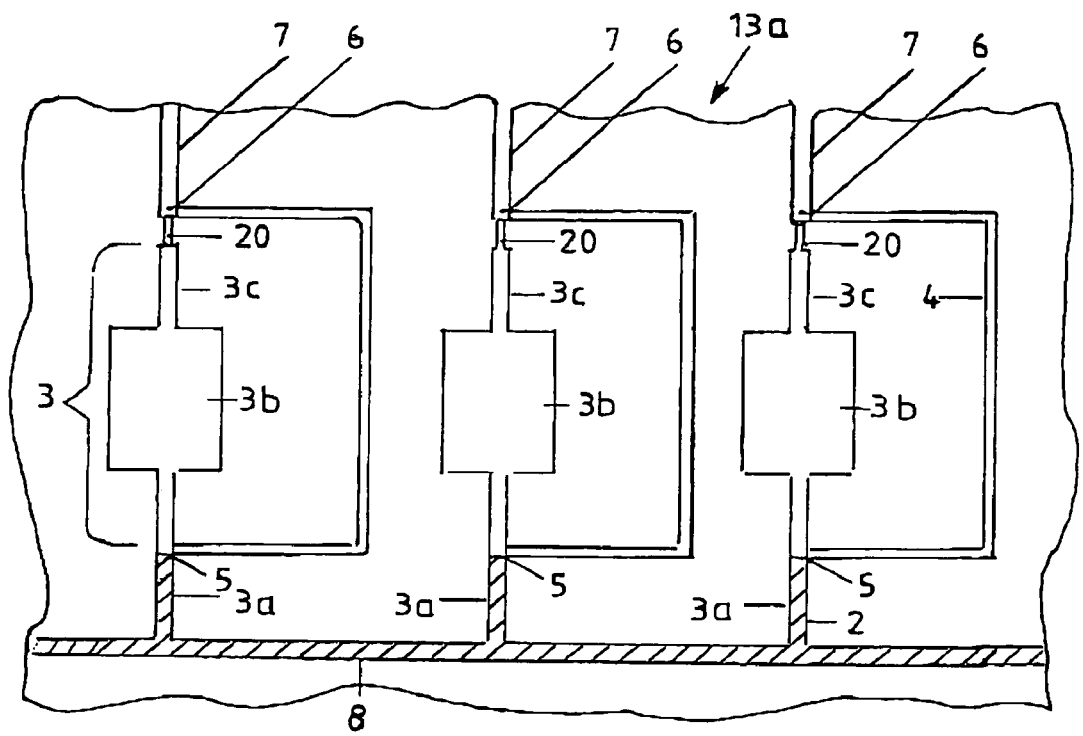

Reference is made to FIG. 4a below. This figure shows a microfluidic arrangement 13a of the invention. The microfluidic arrangement 13a corresponds to a combination of three microfluidic switches according to the third embodiment 12, the microfluidic switches according to the third embodiment 12 being arranged parallel to one another and being supplied with liquid via a common feed channel 8. The inlet channel systems 2 of the three microfluidic switches, which are connected in parallel according to the third embodiment branch off from this common feed channel 8. The entire microfluidic arrangement 13a is thus formed by the switches according to the third embodiment 12 and the feed channels 8. Otherwise each of the switches of the embodiment 13a works like an individual microfluidic switch according to the third embodiment 12.

Figure 4B:
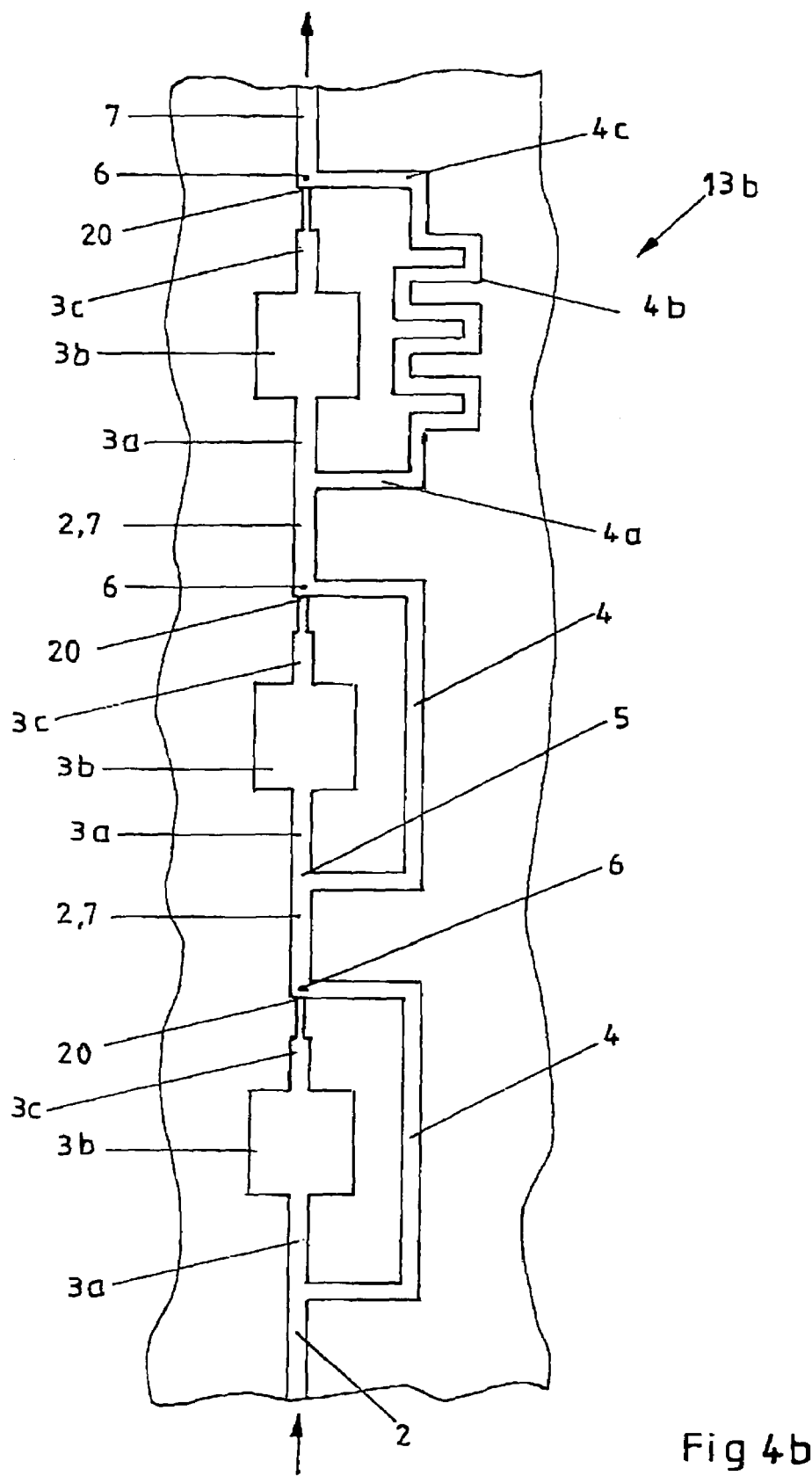

The microfluidic arrangement 13b shown in FIG. 4b has three microfluidic switches according to the third embodiment 12. The microfluidic switches are connected in series behind one another, i.e. in the transport direction of the liquids the inlet channel system 2 of the second switch is connected to the outlet channel system 7 of the first switch and the inlet channel 2 of the third switch is connected to the outlet channel 7 of the second switch. The individual switches correspond to the switches according to the third embodiment 12 as is shown in FIGS. 3a to 3c. Only the third switch of the microfluidic arrangement as shown in FIG. 4b is made differently in the area of the second channel system 4. The second channel system 4 has three sections, which lie in succession in the transport direction of the liquid. The first section 4a and the third section 4c are made as simple channels, while the middle and second section 4b is made meander-shaped. The meandering of the second section 4b lengthens the second channel system of the third switch compared to the second channel systems of the first and second switch. In this way the time interval, which passes for the third switch until the liquid from the second channel system 4 reaches the common end area 6, is greater than in the first and in the second switch of the microfluidic arrangement 13b. Otherwise the individual switches of the microfluidic arrangement 13b work like the individual switches according to the third embodiment 12.

Figure 5A:
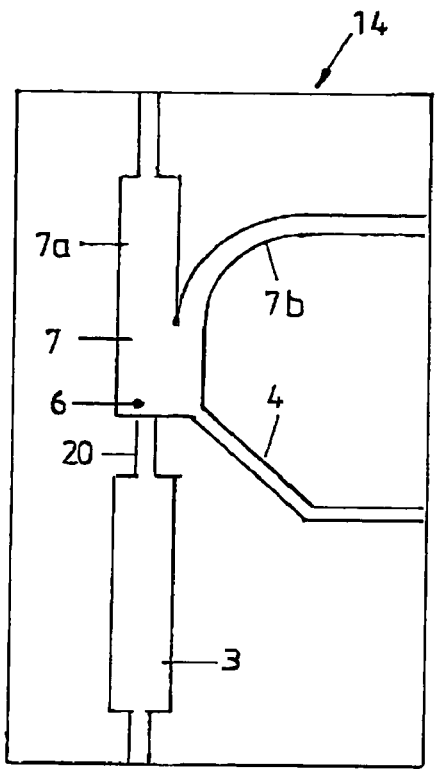
Figure 5B:
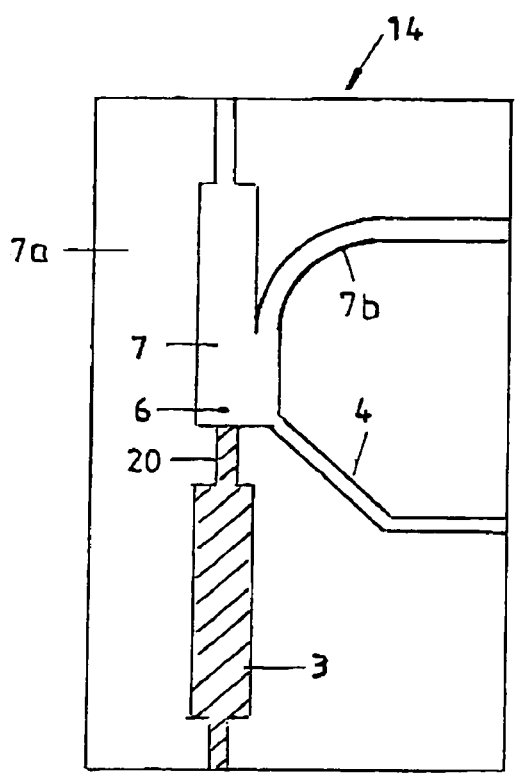
Figure 5C:
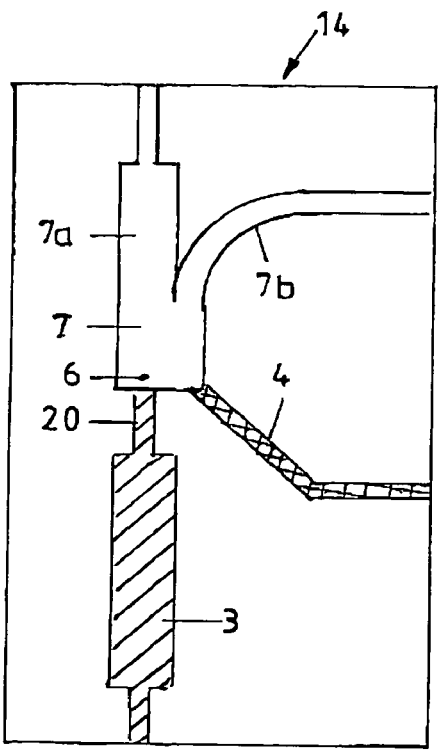
Figure 5D:
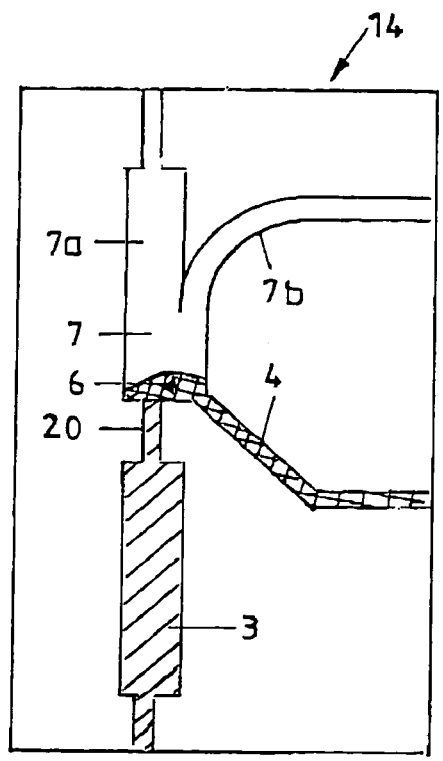
Figure 5E:
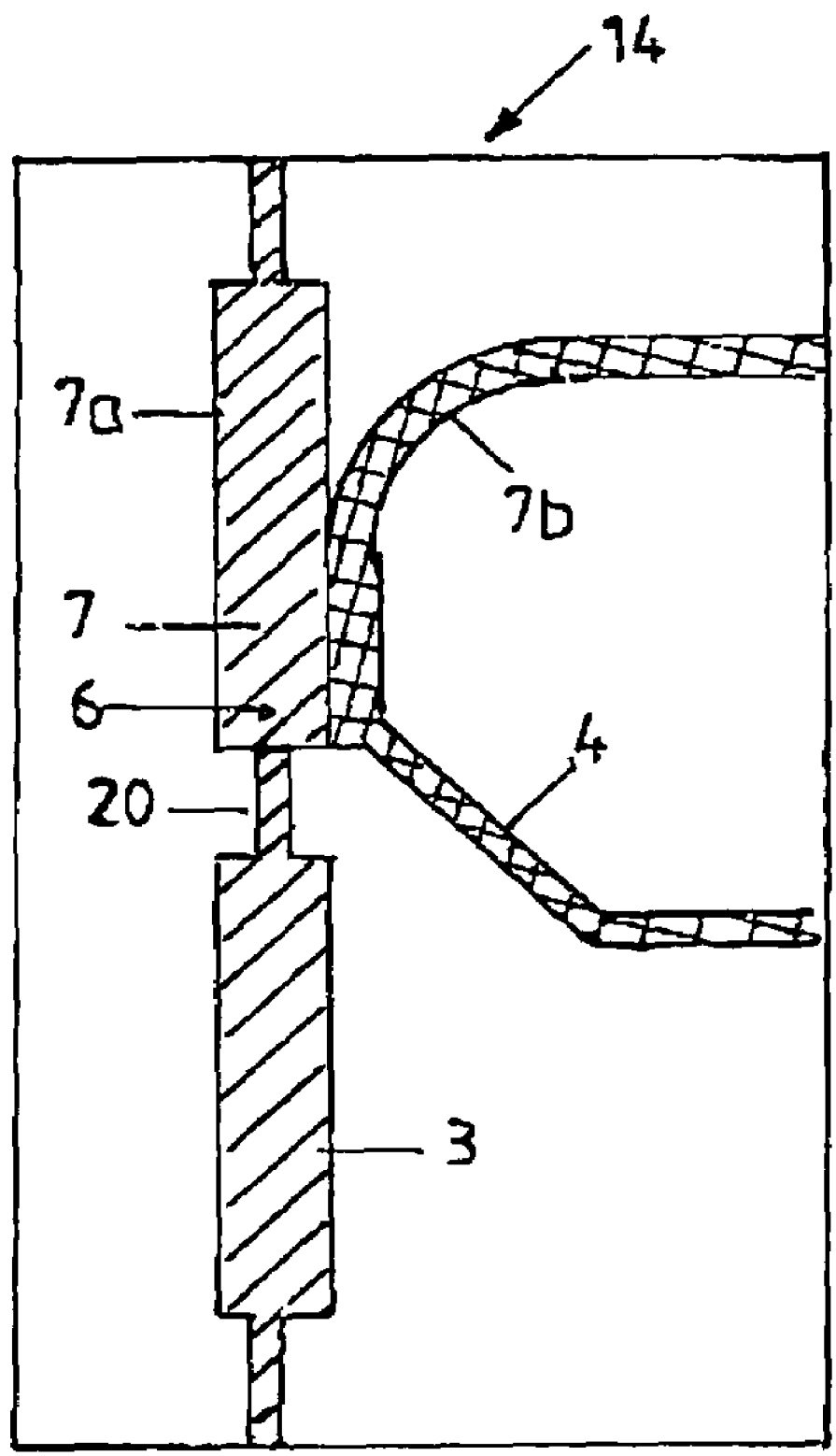
Figure 5H:
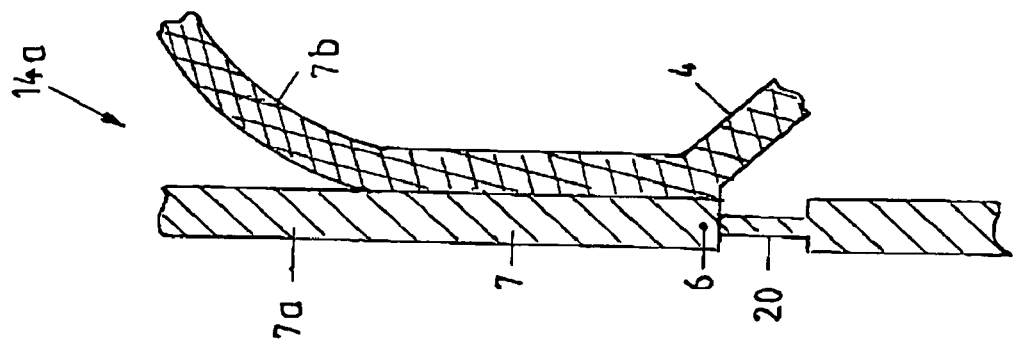
Figure 5G:
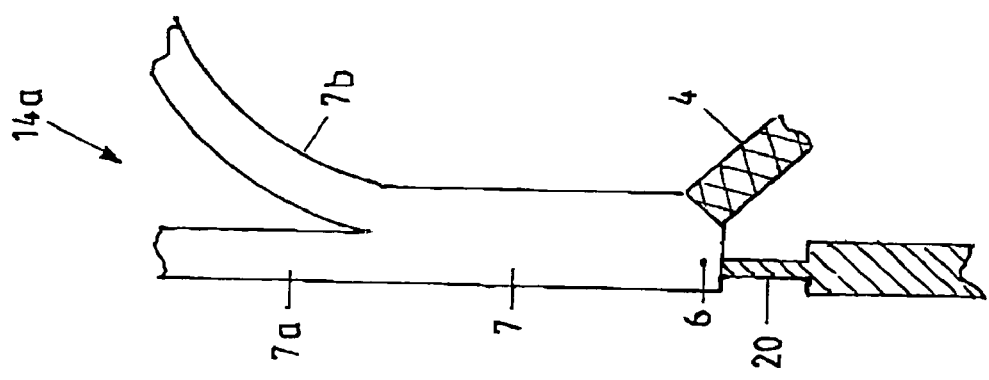
Figure 5F:
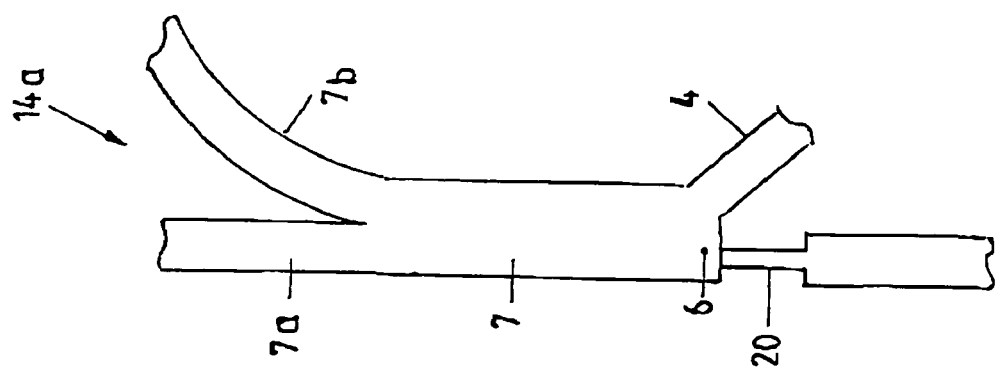
Figure 6A:
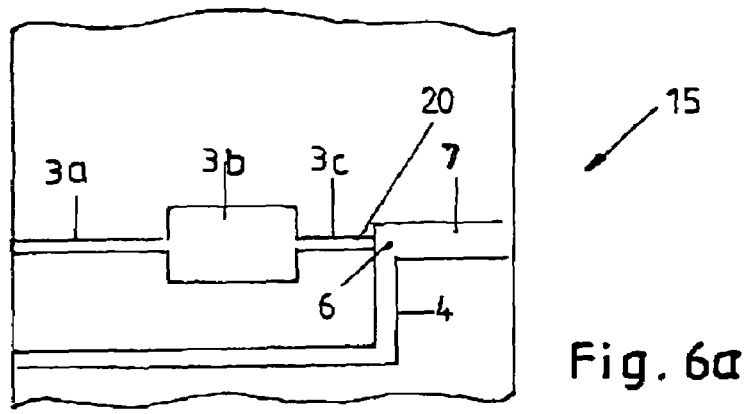
Figure 6B:
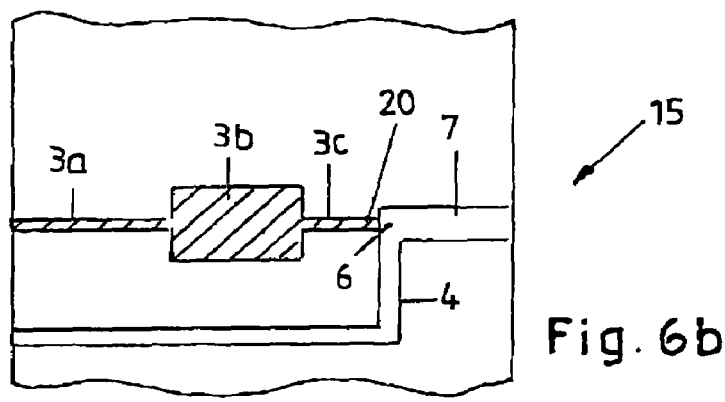
Figure 6C:
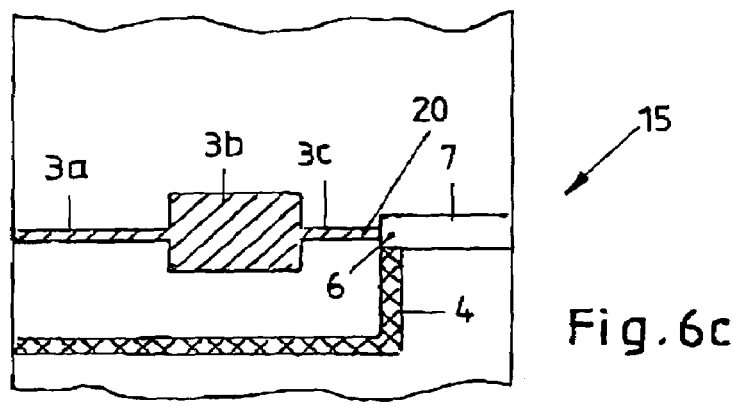
Figure 6D:
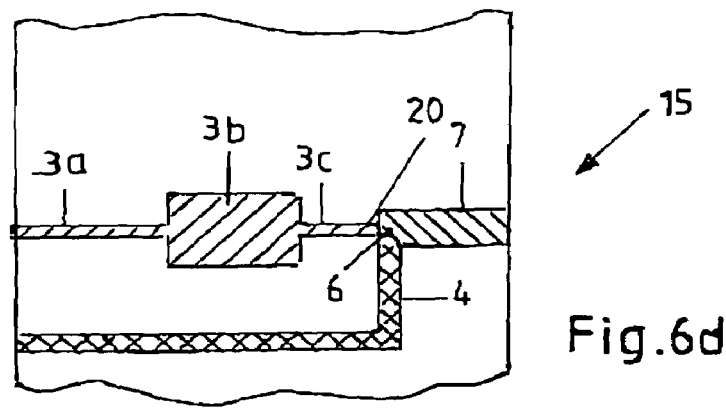
Figure 7A:
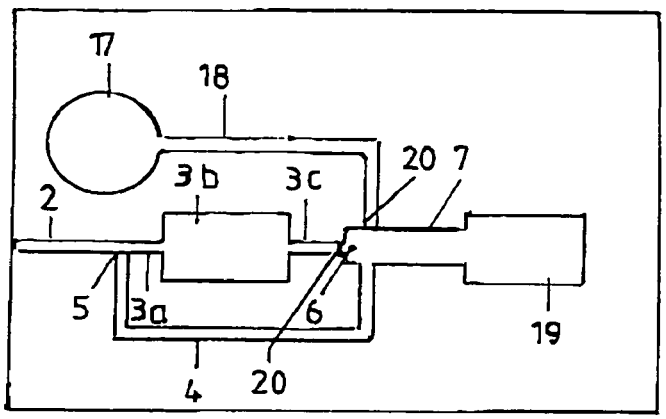
Figure 7B:
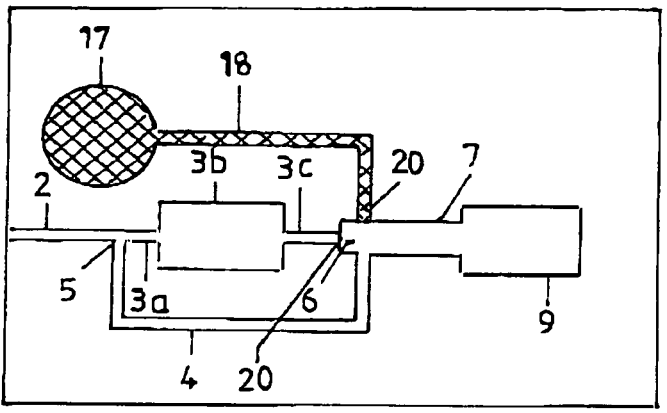
Figure 7C:
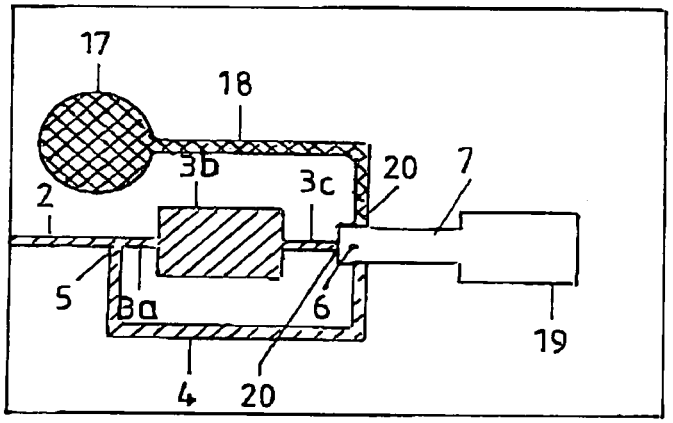
Figure 7D:
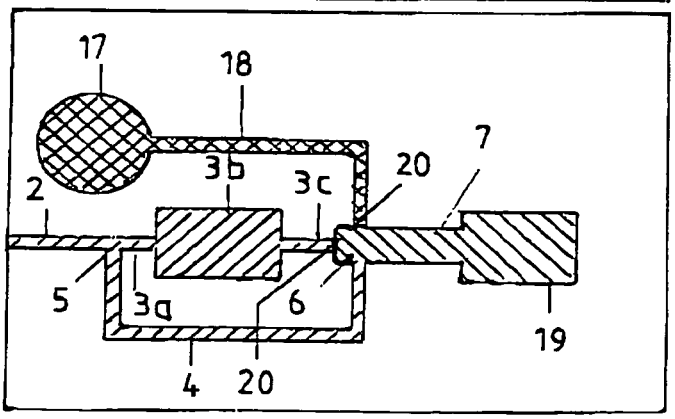

The fourth embodiment 14 of a microfluidic switch of the invention is shown by FIGS. 5a to 5h. Here FIGS. 5f, 5g and 5h show details of FIGS. 5a, 5c, and 5e respectively.

In contrast to the embodiments described so far, in the fourth embodiment 14 the second channel system 4 is routed to the common end area 6 at an acute angle to the first channel system 3. Another difference is that the outlet channel system 7 is divided into a first branch 7a and a second branch 7b spaced away from the common end area. The first branch 7a has a cross sectional area which corresponds essentially to the cross sectional area of the first channel system 3. The second branch conversely has a cross sectional area which corresponds essentially to the cross sectional area of the second channel system 4.

The idea underlying this fourth embodiment of a microfluidic arrangement of the invention is that the liquids which have been fed via the first channel system 3 and the second channel system 4 "lie next to one another" directly [in] the area of the outlet channel system 7 adjoining the common end area 6 without mixing to any noticeable degree and then flow laminarly to the branch point of the first branch 7a and of the second branch 7b where then the liquid which has been fed via the first channel system 3 is drawn off into the first branch 7a and the liquid flowing in via the second channel system 4 is drawn off via the second branch 7b. The property of laminar flows of different liquids is described for example in document DE 195 36 858 C2.

If at this point a product is flowing out of the reaction chamber into the first channel system 3 and from there into the capillary stop 20, as a result of the capillary stop 20 this product remains stationary in the common end area 6. A second liquid then (FIG. 5c) flows up via the second channel system 4, time-delayed to the flow of product into the first channel system 3 or time-delayed to the capillary stop 20 in order to then enter the common end area 6 (FIG. 5d). In doing so the liquid flowing in out of the second channel system 4 wets the exit opening of the capillary stop 20 and neutralizes the operation of the capillary stop 20. The product which is dammed up in the capillary stop 20 and the first channel system 3 is now transported into the end area or into the outlet channel system 7 as a result of the acting capillarity. At the same time further transport of the liquid out of the second channel system 4 takes place. The two liquids which flow into the common end area roughly parallel lie laminarly next to one another due to the absence of turbulence and are transported next to one another via the outlet channel system 7 until at the branch point the product is drawn off essentially via the first branch 7a and the liquid which has flowed in out of the second channel system 4 is drawn off essentially in the second branch 7b.

In the fourth embodiment 14 one preferred version is when the volume of the second channel system 4 is matched to the volume of the channel 7b in order to completely remove the liquid, which flows in via the second channel system 4 from the product in the outlet channel-system 7.

Reference is made to FIGS. 6a to 6d below. In the fifth embodiment 15 which is shown in FIGS. 6a to 6d the liquid which flows in via the second channel system 4 is not branched off beforehand from the parent liquid of the product, as is the case in the first, second, and third embodiment. Rather in the sixth embodiment 15 the second channel system 4 is a separate channel system which discharges directly in the common end area 6 downstream of the capillary stop 20. Such a microfluidic arrangement is for example suited to feeding via the second channel system 4 a substance for a further biochemical reaction (reagent solution) which after neutralization of the capillary stop 20 together with the product which is flowing in via the first channel system 3 and the capillary stop 20 can be routed to other reaction chambers and analysis chambers or the like. Likewise however an inert liquid, which does not influence the product, can also be transported in the second channel system 4 for controlling the capillary stop 20.

Reference is made below to FIGS. 7a to 7d. For a large number of chemical and biochemical analyses it is necessary for the product to the mixed with another liquid in order to engender further reactions for producing a new product. It is likewise possible that the product must be diluted for further analysis. For these procedures a microfluidic arrangement according to the sixth embodiment 16 is suited. In this embodiment 16 specifically the liquid, which is flowing in via the second channel system 4, is used to switch two other channel systems. In addition to the first channel system 3 and the second channel system 4, a third channel system 17, 18 discharges into the common end area 6. This channel system has a cavity 17 and a channel 18, which leads from the cavity 17 to the common end area 6. A second liquid can be added to the cavities 17 from the outside via an opening, which is not shown. This liquid is transported via the channel 18 to the common end area 6 as a result of the acting capillarity. The discharge of the channel 18 into the common end area is made as a capillary stop 20 like the discharge of the first channel system 3 into the common end area 6.

If at this point time-delayed to the liquid transport in the first channel system 3 and the third channel system 17, 18, a liquid is fed via the second channel system 4, in addition to the capillary stop 20 at the end of the first channel system 3, the capillary stop 20 at the end of the third channel system 17, 18 is also wetted from the outside with the liquid which is flowing in out of the second channel system 4. The two capillary stops are neutralized and in the common end area 6 and following it in the outlet channel system 7 the various liquids are transferred via the outlet channel system 7 into another reaction chamber or into an analysis chamber 19. Since the second channel system 4 has the same depth as the common end area 6 and the outlet channel system 7, the liquid which is flowing in from the second channel system 4 can flow unhindered into the common end area 6 and thus wet the two capillary stops 20 for the first channel system 3 and the third channel system 27, 18 and neutralize the capillary stops.

At this point a seventh embodiment 27 for a switch as claimed in the invention will be operated [sic] using FIGS. 8a to 8d. This switch as claimed in the invention has two first channel systems 3 which are led up to a common end area 6. The discharge of the first channel systems 3 is made here as a capillary stop 20 so that a liquid which has been transported into the first channel systems 3 stops at the capillary stops 20 and does not penetrate into the common end area 6.

Furthermore a second channel system 4 discharges into the common end area 4. By means of the liquid, which has been transported in the second channel system 4, the capillary stops 20 can be wetted with a liquid, by which the capillary stops 20 are neutralized and the liquids, which have been fed in the first channels 3, penetrate into the common end area 6. By means of the outlet channel system 7 then the liquids of the two first channel systems, which liquids are located in the common end area 6, and the liquid of the second channel system 4 are transported away from the common end area.

What is claimed is:

1. A microfluidic switch for stopping a liquid flow during a time interval, comprising:
   a switch having at least one first channel and at least one second channel;
   the first channel and the second channel having a common end area;
   the first channel at a transition to the common end area has a means for stopping of a liquid flow flowing in the first channel;
   the stopping means can be controlled by means of a liquid flow flowing in the second channel for continuing the liquid flow in the first channel.

2. The switch as claimed in claim 1, wherein the stopping means are liquid-controlled microvalves.

3. The switch as claimed in claim 1, wherein the stopping means are capillary stops.

4. The switch as claimed in claim 3, wherein the capillary stop has suddenly changing geometrical properties.

5. The switch as claimed in claim 3, wherein the capillary stop has suddenly changing geometrical properties of the surface.

6. The switch as claimed in claim 1, wherein the first channel and the second channel have a common starting area.

7. The switch as claimed in claim 6, wherein the common starting area is located upstream or downstream of a cavity or a chamber.

8. The switch as claimed in claim 1, wherein the first channel and the second channel have separate starting areas.

9. The switch as claimed in claim 1, wherein the first channel and the second channel are filled with liquids separately from one another.

10. The switch as claimed in claim 1, wherein the first channel is shorter than the second channel.

11. The switch as claimed in claim 1, wherein the first channel has a greater capillarity than the second channel.

12. The switch as claimed in claim 1, wherein the second channel has a preferably adjustable means for deceleration of a liquid flow.

13. The switch as claimed in claim 12, wherein the deceleration means are chokes.

14. The switch as claimed in claim 6, wherein one inlet channel is connected upstream of the common starting area (5).

15. The switch as claimed in claim 6, wherein one outlet channel is connected downstream of the common starting area.

16. The switch as claimed in claim 14, wherein the first channel, the second channel, the inlet channel and/or the outlet channel have sections with one or more cavities, chambers and/or cavities and thus form channel systems.

17. The switch as claimed in claim 14, wherein the first channel, the second channel, the inlet channel and/or the outlet channel have meander-shaped sections.

18. The switch as claimed in claim 16, wherein there are reagents in one or more of the cavities.

19. The switch as claimed in claim 15, wherein the outlet channel system has a branching.

20. The switch as claimed in claim 6, wherein the common end area is made such that the liquid, which is emerging from the first channel, and the liquid, which is emerging from the second channel, lie laminarly next to one another.

21. The switch as claimed in claim 1, wherein the switch has a plurality of first channels.

22. The switch as claimed in claim 1, wherein the switch has a plurality of second channels.

23. A carrier, especially a sample carrier, wherein the carrier has a switch as claimed in claim 1.

24. A process for operating a switch as claimed in claim 1, wherein:
   transport of a first liquid in a first channel up to the stopping means,
   time-delayed transport of a second liquid in the second channel to the common end area,
   triggering of the stopping means by a second liquid for further transport of the first liquid beyond the stopping means.

25. The process as claimed in claim 24, wherein transport of the liquid in the first channel and/or in the second channel by capillarity.

26. The process as claimed in claim 24, wherein the second liquid is a highly wetted liquid.

* * * * *